E. S. MIX.
PACKING.
APPLICATION FILED JUNE 26, 1915.
1,174,598.
Patented Mar. 7, 1916.
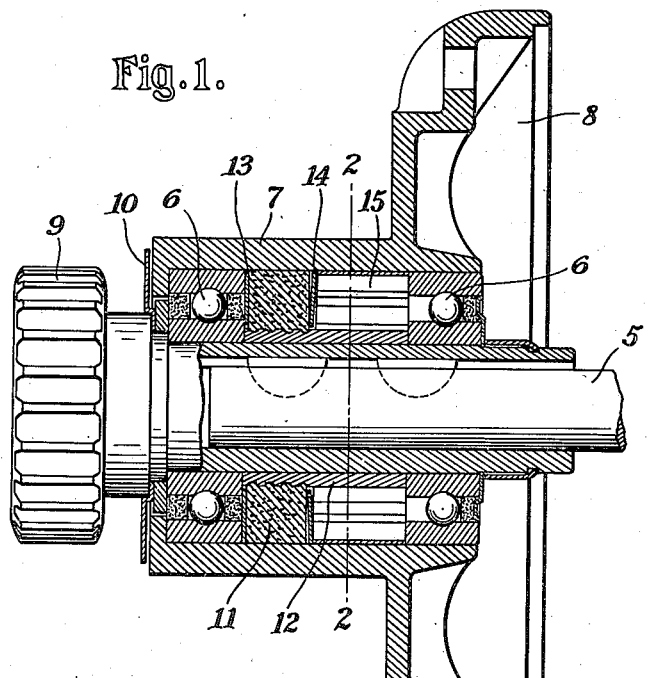
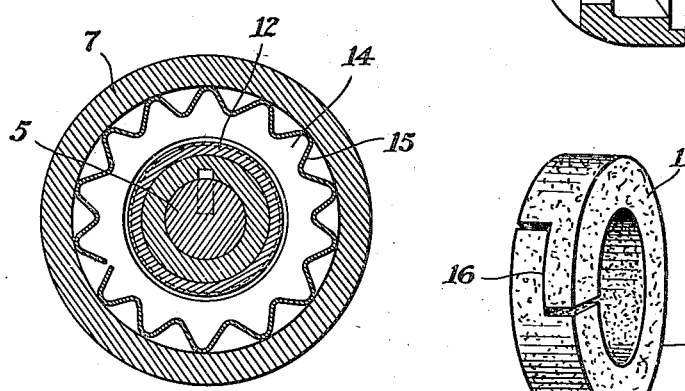
Inventor:
Edwin S. Mix
by his attorneys
Davis & Dorsey

UNITED STATES PATENT OFFICE.

EDWIN S. MIX, OF ROCHESTER, NEW YORK, ASSIGNOR TO NORTH EAST ELECTRIC COMPANY, OF ROCHESTER, NEW YORK, A CORPORATION OF NEW YORK.

PACKING.

1,174,598.      Specification of Letters Patent.      Patented Mar. 7, 1916.

Application filed June 26, 1915. Serial No. 36,469.

*To all whom it may concern:*

Be it known that I, EDWIN S. MIX, a citizen of the United States, and resident of Rochester, in the county of Monroe and State of New York, have invented certain new and useful Improvements in Packings, of which the following is a specification.

This invention relates to a packing adapted particularly for preventing the leakage of oil or other fluids along a shaft or other rotating member.

In packing a rotary joint it is desirable to reduce the friction arising from the packing to the lowest practical degree, while maintaining a fluid-tight joint, and in the case of joints in which the fluid in question is not subjected to pressure the principal desideratum of such a packing is the maintenance of a smooth and impervious surface for engagement with the rotating member. I have found that cork is especially suitable for such a purpose, as it readily acquires and maintains, when in use, a surface of the kind required, and is adapted to maintain a fluid-tight joint without the necessity of heavy pressure against the rotating surface. The simplest way to use cork for the purpose in question is to form a ring of this material, and interpose the ring between the rotating member or shaft, and a concentric inclosing sleeve or casing, the ring being originally enough larger than the space between the rotary member and the sleeve to be somewhat compressed against the opposed surface of both of these members, although the pressure may be light.

In the use of an arrangement such as that just described I have found that although originally the cork may be so proportioned that it is pressed with substantially equal force against the sleeve and the rotary member, after it has been in use for some time the material contracts slightly, with the result that it tends to bind upon the rotary member and to shrink away from the sleeve, so that the closeness of the joint against the sleeve is diminished, and the ring may even rotate with the rotary member instead of remaining stationary.

One object of the present invention is to produce a packing in which the disadvantage above pointed out is eliminated, and in which any contraction or expansion which may occur in the material of the packing-ring is prevented from resulting in an excessive pressure of the material against either of the opposed surfaces. I have found that this may be accomplished, in a simple and satisfactory manner, by interrupting the packing-ring by a lap-joint. By this device shrinkage or expansion of the material is permitted to result in a free peripheral contraction or extension, without any resulting radial effect, so that notwithstanding such shrinkage or expansion the material may still be compressed between the rotary member and the sleeve with substantially equal pressure against the opposed surfaces.

Another feature of the invention resides in the use of a cork packing-ring in coöperation with a rotary member having a series of annular grooves in its bearing-surface. I have discovered that after the packing has been in use for a short time the cork, although originally smooth, swells into such grooves and thus produces, with a light pressure against the rotary member, a very effective seal against the passage of oil or other fluids, and if the surface of the rotary member be smooth and true the wear upon the packing is negligible.

In the accompanying drawings:—Figure 1 is a vertical axial section of a rotary joint provided with a packing embodying the present invention; Fig. 2 is a section on the line 2—2 in Fig. 1, looking from right to left in the latter figure; and Fig. 3 is a perspective view of the cork packing-ring employed in the joint of Fig. 1.

The invention is illustrated as embodied in a structure designed for use in connection with electric motors and generators. One end of an armature-shaft 5 is shown, this shaft being journaled in ball-bearings 6, which are mounted in a sleeve 7. This sleeve projects integrally from the end-member 8 of the casing of the machine. A sprocket-wheel 9 is fixed to the shaft at the outer end of the sleeve 7, this sprocket-wheel being used for the purpose of connecting the shaft with a source of power, such as a gasolene engine.

The sprocket-wheel 9, in the case of a motor or generator connected with a gasolene-engine, is usually incased and bathed in lubricating oil, and by the operation of the sprocket-chain on the sprocket this oil is more or less projected or sprayed toward the end of the sleeve 7. A flange or oil-guard 10 may be employed upon the hub of the sprocket-wheel, but even in that case more or less oil will work into the end of the sleeve, and it is desirable to prevent this oil from working along the shaft and entering the casing of the machine. For this purpose the packing of the present invention is employed.

In accordance with the present invention a packing-ring 11 is formed of cork, and this ring is interposed between the inner surface of the sleeve 7 and the outer surface of a metal bushing 12, which is concentric, and rotates, with the shaft 5. Axial movement of the packing-ring is prevented by a metal washer 13, interposed between the packing-ring and the outer ball-bearing, and a second washer 14 which is spaced from the inner ball-bearing by a crimped metal strip 15. In this manner the packing-ring is retained in engagement with a part of the bushing 12 which is provided with annular grooves, as shown particularly in Fig. 1. The packing-ring is divided by a lap-joint 16, as shown in Fig. 3, and it is of such dimensions that when originally placed in position it is compressed slightly between the sleeve 7 and the bushing 12. After the packing has been in use a short time the cork swells into the grooves, as shown in Fig. 1, thus making a close seal between the cork and the bushing, although the cork does not rotate with the bushing but remains stationary, owing to the greater area of its surface of engagement with the sleeve 7. In case any contraction occurs in the material of the packing-ring, this contraction occurs principally in a peripheral direction, and results merely in a slight relative movement of the overlapping ends of the ring, while the close engagement of the bearing-surfaces of the cork with the sleeve and the bushing are still maintained, and the form of the lap-joint 16 is such that it does not afford a passage for oil, notwithstanding the movement in question, owing to the fact that the overlapping ends of the cork are held in close engagement with each other. To insure such engagement the washer 14 may be made of thin resilient metal and slightly dished, as shown in Fig. 1, so that it will engage the cork constantly with a spring-pressure.

It will be apparent that although cork is the best material which I have so far discovered for use in a packing such as that described, the invention, in its broadest aspect, is not limited to the use of this particular material, and that the described form and arrangement of the packing-ring and the other parts may be useful in connection with various other materials.

I claim:—

1. A packing comprising, in combination with a sleeve and a coaxial rotary member inclosed therein, a ring of compressible elastic material interposed and compressed between the sleeve and the rotary member, the ring being interrupted by a lap-joint to permit peripheral expansion and contraction whereby the pressure of the ring against the opposed surface may be substantially equalized, and means for confining the ring laterally.

2. A packing comprising, in combination with a sleeve and a coaxial rotary member inclosed therein and provided with a series of annular grooves, a ring of cork interposed and compressed between the sleeve and the grooved surface of the rotary member, the ring being interrupted to permit peripheral expansion and contraction.

EDWIN S. MIX.